(12) United States Patent
Mihaylov et al.

(10) Patent No.: US 6,867,870 B1
(45) Date of Patent: Mar. 15, 2005

(54) DIGITAL DETECTOR DATA COMMUNICATION IN AN OPTICAL METROLOGY TOOL

(75) Inventors: Mihail Mihaylov, San Jose, CA (US); Dale Lindseth, Hollister, CA (US)

(73) Assignee: Therma-Wave, Inc., Fremont, CA (US)

( * ) Notice: Subject to any disclaimer, the term of this patent is extended or adjusted under 35 U.S.C. 154(b) by 239 days.

(21) Appl. No.: 10/262,722

(22) Filed: Oct. 2, 2002

Related U.S. Application Data

(60) Provisional application No. 60/336,847, filed on Nov. 1, 2001.

(51) Int. Cl.[7] .............................................. G01B 11/24
(52) U.S. Cl. .................................. 356/601; 250/559.22
(58) Field of Search ................................ 356/364–369, 356/601–623, 445–448; 250/559.22; 725/62, 86, 87, 134

(56) References Cited

U.S. PATENT DOCUMENTS

| | | | | |
|---|---|---|---|---|
| 5,644,141 A | * | 7/1997 | Hooker et al. | 250/559.22 |
| 6,405,591 B1 | * | 6/2002 | Colarelli et al. | 73/462 |
| 6,546,785 B1 | * | 4/2003 | Discenzo | 73/53.05 |

* cited by examiner

*Primary Examiner*—Hoa Q. Pham
(74) *Attorney, Agent, or Firm*—Stallman & Pollock LLP

(57) ABSTRACT

A detector network for an optical metrology system includes an analog to digital converter for each photodetector or detector array. Each analog to digital converter is connected to provide digitally encoded output from its associated detector. Each analog to digital converter is also connected to a hub. The hub receives commands from a processor and distributes them to the analog to digital converters. The converters sample the output of their associated detectors and return the digitized results to the hub. In turn, the hub passes the digitized results to the processor for analysis.

17 Claims, 2 Drawing Sheets

DIGITAL DETECTOR DATA COMMUNICATION IN AN OPTICAL METROLOGY TOOL

PRIORITY CLAIM

The present application claims priority to U.S. Provisional Patent Application Ser. No. 60/336,847, filed Nov. 1, 2001, which is incorporated herein by reference.

TECHNICAL FIELD

This subject invention relates to a detector network for an optical metrology system in which the output of each photodetector is digitized at the detector and then collected by a centralized hub.

BACKGROUND OF THE INVENTION

As geometries continue to shrink, manufacturers have increasingly turned to optical techniques such as ellipsometry and reflectometry to perform non-destructive inspection and analysis of semi-conductor wafers. Techniques of this type are commonly referred to as optical metrology and are based on the notion that a subject may be examined by analyzing the reflected energy that results when a probe beam is directed at the subject. For the specific case of ellipsometry, changes in the polarization state of the probe beam are analyzed. Reflectometry is similar, except that changes in magnitude are analyzed. Ellipsometry and reflectometry are effective methods for measuring a wide range of attributes including information about thickness, crystallinity, composition and refractive index. The structural details of ellipsometers are more fully described in U.S. Pat. Nos. 5,910,842 and 5,798,837 both of which are incorporated in this document by reference.

Scatterometry is a related optical metrology technique that measures the diffraction (optical scattering) that results when a probe beam is directed at a subject. Scatterometry is an effective method for measuring the critical dimensions (CD) of structural features (such as the lines and other structures included in integrated circuits). Scatterometry can be used to analyze two periodic two-dimensional structures (e.g., line gratings) as well as periodic three-dimensional structures (e.g., patterns of vias or mesas in semiconductors). Scatterometry can also be used to perform overlay registration measurements. Overlay measurements attempt to measure the degree of alignment between successive lithographic mask layers.

As shown in FIG. 1, a typical optical metrology tool includes a light source that creates a probe beam. The probe beam is focused by one or more lenses on a subject. The subject reflects the probe beam. The reflected energy is focused by another lens (or lenses) before reaching a detector. A processor analyzes the measurements made by the detector. These basic components in different configurations and variations are common to most optical metrology tools including ellipsometers, reflectometers, and scatterometers. The basic similarity between these different systems often means that a single system will be configured to perform multiple types of analysis. For this reason, it is common to see metrology systems that include one or more illumination sources combined with a series of detectors. This can happen, for example when a single system includes detectors to perform both ellipsometry and reflectometry. Single systems may also include multiple detectors to perform different types of ellipsometry or reflectometry. Multiple detectors may also be used to separately analyze different spectral portions of a reflected probe beam. Each of these cases is illustrated by the metrology system described in U.S. Pat. Ser. No. 6,278,519 which is incorporated herein by reference. As described in the latter patent, a metrology system can include multiple measurement modalities with separate detectors. Additional detectors not illustrated in the latter patent are typically provided for monitoring incident light levels used for normalization and calibration.

The use of multiple detectors creates multiple data streams each of which must typically be converted to digital form prior to analysis. For this reason, most optical metrology systems include an analog to digital converter (A/D converter) and a selector or multiplexer that is used to select between the different detectors. Unfortunately, the use of a single A/D converter multiplexed between multiple detectors has known drawbacks. One such drawback is possibility that errors may occur in the analog transmissions between the detectors and A/D converter. These transmissions typically take place over cable links between the detectors and the A/D converter. The cables are generally susceptible to electrical noise from a range of sources and must be carefully shielded to reduce the potential for errors. Even when shielded, errors may still occur and are often difficult to detect or repair.

A second drawback becomes apparent when the output of multiple detectors must be sampled simultaneously. When a single A/D converter is used, this type of sampling is performed serially, one detector at a time. This introduces a time-skew into the data generated for different detectors. This can reduce the accuracy of calculations that are based on the outputs of multiple detectors.

SUMMARY OF THE INVENTION

The present invention provides a detector network for optical metrology systems. For a representative implementation of the detector network, an optical metrology system is configured so that each photodetector has an associated A/D converter. Each A/D converter is connected to directly receive the output of the associated detector without the use of extensive cabling or any cabling at all. Each A/D converter is also connected to a centralized hub. The connections between the hub and the A/D converters are bi-directional. The hub uses these connections both for sending control signals to the A/D converters and for receiving the digital data generated by the A/D converters.

The output from the hub is provided to a digital data acquisition board that formats the data depending on which detector is generating the received output. The digital acquisition board then supplies the data to a processor for evaluation.

During normal operation, the hub selects one or more A/D converters for data collection. The hub instructs the selected A/D converters to return the digitized output of their associated detectors. This instruction may be synchronous, allowing the output of each detector to be sampled at the same instant. Asynchronous operation is also possible. After receiving instructions from the hub, each A/D converter samples the output of its associated detector and converts that output to digital form. The digital form is then forwarded to the hub, typically in serial fashion. The hub collects the various digital outputs and sends them to the data acquisition board. Each output is then formatted (when required) and then forwarded to the processor for analysis.

In this way, the detector network eliminates the time skew associated with traditional systems where a single A/D converter is multiplexed between detectors. Transmission errors are also eliminated since all data transmissions are performed digitally allowing any level of data integrity to be supported. Digital transmission is advantageous since it is not prone to noise interference, preserves full resolution, and with averaging, allows even greater resolution to be obtained.

DETAILED DESCRIPTION OF THE PREFERRED EMBODIMENTS

Figure 1:
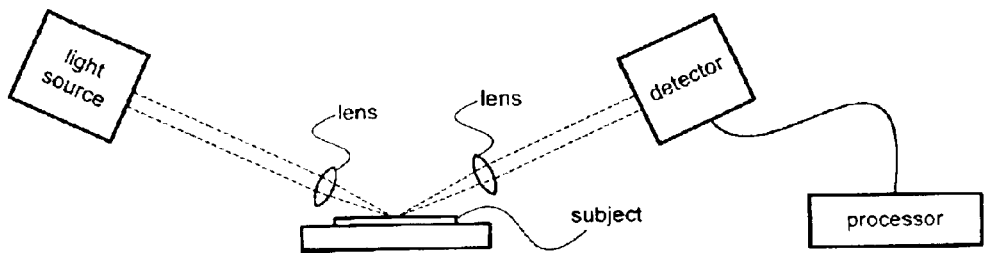
FIG. 1 is a diagram of an optical metrology system shown as a representative environment for the detector network of the present invention.
Figure 2:
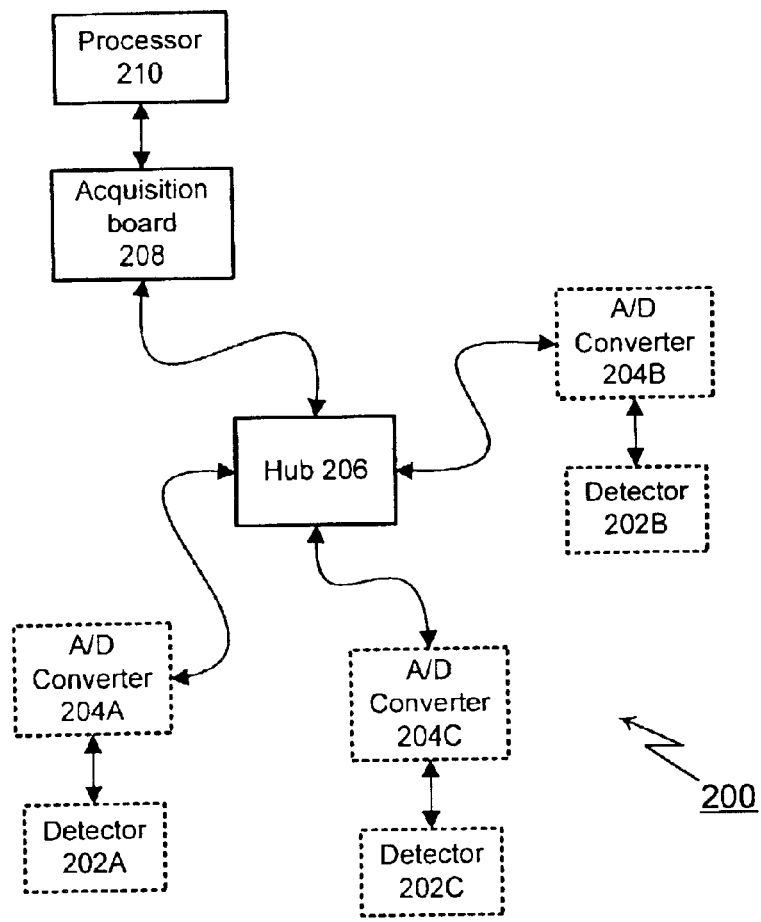
FIG. 2 is a diagram of a representative implementation of the detector network of the present invention.

As shown in FIG. 2, the present invention provides a detector network 200 for optical metrology systems. For this particular description it is assumed that the detector network is used in an optical metrology system that includes three separate detectors. In FIG. 2, the three detectors are labeled 202A, 202B and 202C respectively. Detectors 202 are intended to be representative of the full range of photodetectors used in optical metrology systems of all types. It should also be appreciated that detector network 200 may be used in combination with any number of detectors 202.

An analog to digital converter 204 is associated with each detector 202. A/D converters 204 may be selected from the complete range of commercially available or purpose built units of this type. A/D converters 204 may also have any appropriate resolution. Ideally, A/D converters 204 are selected so that their respective resolutions are equal to or greater than the desired resolution for the end measurement. Typically, this means that A/D converters 204 have at least a sixteen-bit resolution. Each A/D converter 204 is situated at or in close proximity to its associated detector 202. This minimizes the length of any cabling that is used to transmit the output of the detectors 202 to their associated A/D converters. In practice, is it generally sufficient if cables of this type are less than one meter in length. In the preferred embodiment, the detector and the A/D converter are located on the same printed circuit board assembly, thereby rendering the connection length near zero.

Each A/D converter 204 is connected to a hub 206. This interconnection may be accomplished using a range of different communication technologies. For the particular implementation shown in FIG. 2, a point-to-point interconnection is used. Daisy-chain topologies may also be used. The interconnections may be serial or multiple bits wide and may be implemented using any proprietary or industry standard bi-directional bus such as Firewire (IEEE-1394), universal serial bus (USB), or small computer system interface (SCSI).

Hub 206 functions as a communications locus for network 200. Commands for A/D converters 204 are distributed by hub 206. Hub 206 also receives the output of A/D converters 204. To prevent data loss, hub 206 buffers the data received from A/D converters 204. Hub 206 may also buffer commands for A/D converters 204.

Hub 206 is preferably configured to support synchronized operation of A/D converters 204. This allows each of the A/D converters 204 to sampled at the same instant-eliminating time skew between measurements taken at different detectors 202. In cases where a point-to-point interconnections are used between hub 206 and A/D converters 204, synchronized operation is implemented by simultaneously sending the same command to A/D converters 204 and sequentially reading the output of A/D converters 204 following simultaneous conversion. In cases where a daisy-chain topology, it may be assumed that each A/D converter 204 receives the command at the same instant (since the actual time of propagation for any command will be extremely small). The output of the A/D converters 204 must be read sequentially in a way that preserves the integrity of each detector's data. The hub receives data and synch signals from all measurement light detectors and multiplexes them into serial data and synch signals. In the case of multiplex signals from a common detector or CCD array, the data is assembled into 16 or 32 bits depending on the mode of data collection. The hub board provides the signal and timing to each of the remote detectors and A/D converters and controls their sequential readout.

Hub 206 is connected to a digital acquisition board 208. The hub communicates with the data acquisition board through a combination of serial data, clock and control signals. Digital acquisition board 208 acts as an interface between hub 206 and a processor 210. In most cases, this means that digital acquisition board 208 is an ISA, PCI or PCMCIA card. Other card, board or bus technologies may be used as appropriate. To prevent data loss, the data acquisition board buffers the receive data using a sufficient number of FIFO buffers. Processor 210 analyzes the data received from digital acquisition board 208. Processor 210 also sends commands to digital acquisition board 208 for distribution by hub 206 to control operation of A/D converters 204.

Figure 3:
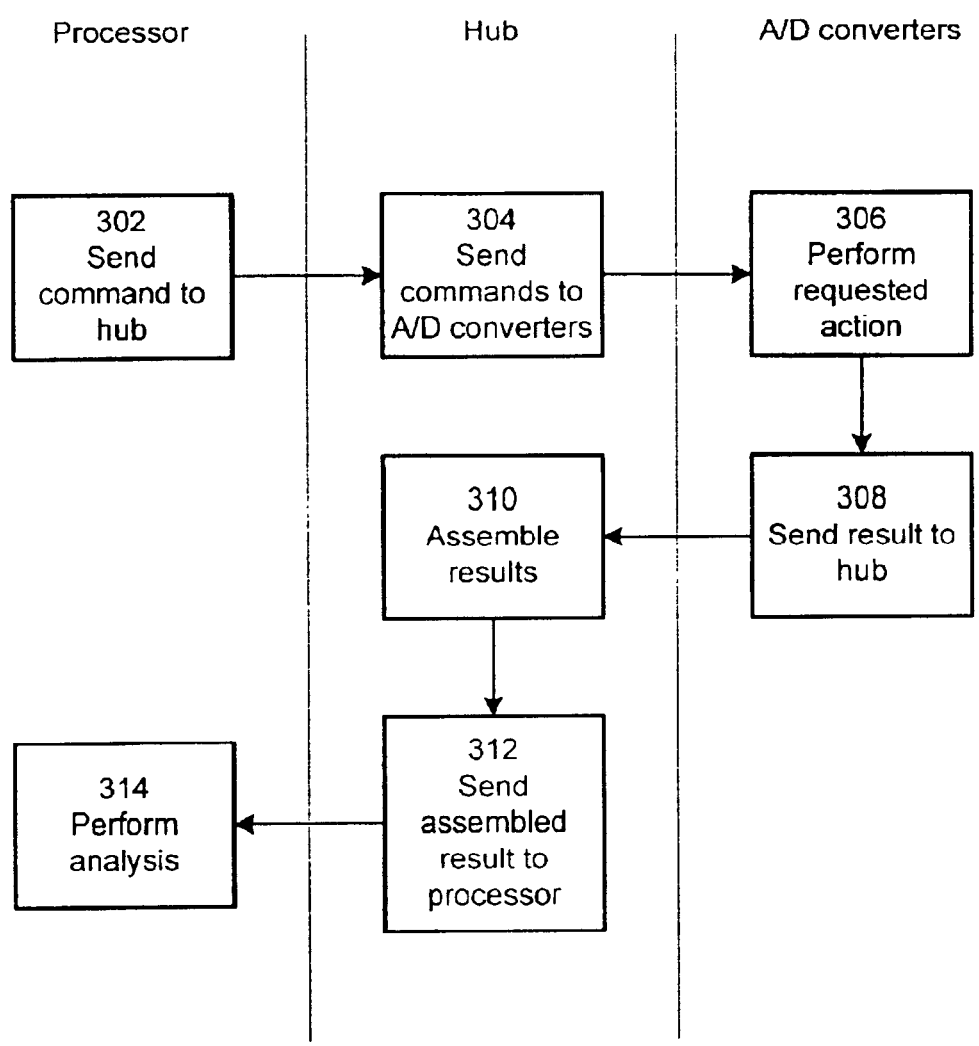
FIG. 3 is a flowchart showing a typical operation performed by the detector network of the present invention.

As shown in FIG. 3, a typical use of detector network 200 begins when processor 210 uses data acquisition board 208 to send a command to hub 206 (sec step 302). For the current example, it may be assumed that this command is a request for detectors 204 to perform a sampling operation. In other cases, the command may be related to control, configuration, calibration, status or other functions. The hub provides conditional and fused power to all measurement light detectors, in addition to conditioning the power to run the hub itself. These functions are performed under supervision of the hub control logic. The logic performs the data serialization, digital multiplexing and control signal generation.

In step 304, hub 206 relays the command to A/D converters 204. The A/D converters 204 then perform the requested command (see step 306). In this case, this means that A/D converters 204 sample the output of detectors 202 and produce corresponding digitally encoded outputs. A/D converters 204 receive the sample command at the same instant and perform their sampling operations in unison. In this way, time skew between detectors is minimized. A/D converters 204 then send their digital outputs to hub 206 (see step 308).

Hub 206 assembles the digitally encoded outputs received from the A/D converters 204 (see step 310) and sends assembled results back digital acquisition board 208 and processor 210 (see step 312). In step 314, processor 210 uses the command results to as pan of its metrology analysis.

In this way, detector network 200 eliminates the time skew associated with traditional systems where a single A/D converter is multiplexed between detectors. Transmission errors are also eliminated since all data transmissions are performed digitally allowing any level of data integrity to be supported.

In addition to sampling, detector network 200 may be used to perform a range other functions, such as control, configuration and calibration of detectors 202 and A/D converters 204. Detector network 200 may also be used to provide remote access to detectors 202 for external systems. It should also be appreciated that detector network 200 may be used with a range of sensors, detectors and devices and is not limited to the specific example of photo-detectors. For example, detectors can include scanned photodiodes and/or CCD arrays or photomultiplier tubes.

While the subject invention has been described with reference to a preferred embodiment, various changes and modifications could be made therein, by one skilled in the art, without varying from the scope and spirit of the subject invention as defined by the appended claims

What is claimed is:

1. A detector network for an optical metrology system, the detector network comprising:

a plurality of detectors;

a plurality of analog to digital converters associated with the detectors, each analog to digital converter functioning to digitally encode the output of an associated detector and decode a digitally encoded command for the associated detector; and a hub connected to each of the plurality of analog to digital converters, the hub configured to receive the digitally encoded output provided by each of the analog to digital converters and generate a single output data stream containing the digitally encoded output from the plurality of detectors, the hub further configured to receive a command data stream containing digitally encoded commands for each detector and distribute the commands to the appropriate analog to digital converters.

2. A detector network as recited in claim 1 that further comprises a data acquisition board, the data acquisition board acting as an interface between the hub and a processor, allowing the processor to send commands to the hub to be forwarded to the analog to digital converters and to receive the output data stream from the hub containing the digitally encoded output provided by the analog to digital converters.

3. A detector network as recited in claim 1, wherein each analog to digital converter is directly connected to the hub and the hub is configured to simultaneously send commands to each of the analog to digital converters.

4. A detector network as recited in claim 3, wherein the hub is configured to simultaneously receive the digitally encoded output provided by each of the analog to digital converters.

5. A detector network as recited in claim 1, wherein each analog to digital converter is part of a detector assembly for the associated detector.

6. A detector network as recited in claim 5, wherein at least one of the analog to digital converters is included on a circuit board with the associated detector.

7. A detector network as recited in claim 1, wherein the hub can buffer the digitally encoded output provided by each of the analog to digital converters before sending the digitally encoded output in the single output data stream.

8. A detector network as recited in claim 1, wherein the hub can buffer the digitally encoded commands in the command data stream before distributing the commands to the appropriate analog to digital converters.

9. A detector network as recited in claim 1, wherein the hub supports synchronized operation of the analog to digital converters.

10. A method for controlling a detector network in an optical metrology system, the method comprising:

sending a command from a hub to at least one of a plurality of analog to digital converters, each analog to digital converter connected to provide digitally encoded output from an associated detector; and receiving by the hub the digitally encoded output of each analog to digital converter, whereby the hub can generate a single output data stream containing the digitally encoded output for each associated detector.

11. A method as recited in claim 10 that further comprises:

sending, by a processor, the command to the hub; and sending by the hub, the digitally encoded output to the processor.

12. A method as recited in claim 10, wherein the command is simultaneously sent to each analog to digital converter.

13. A method as recited in claim 10, wherein the hub serially receives the simultaneously converted and digitally encoded output provided by each of the analog to digital converters.

14. A method as recited in claim 10 that further comprises:

sending, by a processor, the command to the hub; and sending by the hub, the digitally encoded output to the processor.

15. A method as recited in claim 10, wherein the command is simultaneously sent to each analog to digital converter.

16. A method as recited in claim 10, wherein the hub serially receives the simultaneously converted and digitally encoded output provided by each of the analog to digital converters.

17. A method of optically inspecting and evaluating a subject comprising the steps of:

focusing a probe beam on the subject;

sending a command from a hub to at least one of a plurality of analog to digital converters, each analog to digital converter connected to receive the analog output of an associated photo-detector, each photo-detector positioned to receive a portion of the probe beam reflected by the subject, the command causing each analog to digital converter to provide the digitally encoded output of the associated detector; and receiving the digitally encoded output of each analog to digital converter at the hub and generating a single output data stream including the digitally encoded output for each associated detector.

* * * * *